United States Patent [19]
Nagano

[11] Patent Number: 5,680,385
[45] Date of Patent: Oct. 21, 1997

[54] OPTICAL HEAD WITH A HEAT SINK

[75] Inventor: Tsuyoshi Nagano, Tokyo, Japan

[73] Assignee: NEC Corporation, Japan

[21] Appl. No.: 617,187

[22] Filed: Mar. 18, 1996

[30] Foreign Application Priority Data

Mar. 30, 1995 [JP] Japan ................... 7-073091

[51] Int. Cl.⁶ ............................................. G11B 7/135
[52] U.S. Cl. ................. 369/112; 369/44.12; 369/44.14
[58] Field of Search .............................. 369/112, 103, 369/44.12, 44.14, 44.23, 109

[56] References Cited

U.S. PATENT DOCUMENTS

| | | | |
|---|---|---|---|
| 5,406,543 | 4/1995 | Kobayashi et al. | 369/103 |
| 5,446,719 | 8/1995 | Yoshida et al. | 369/44.12 |
| 5,546,371 | 8/1996 | Miyazaki | 369/103 |

FOREIGN PATENT DOCUMENTS

| | | | |
|---|---|---|---|
| 0139628 | 5/1992 | Japan | 369/103 |
| 0206047 | 7/1992 | Japan | 369/44.12 |
| 4-196189 | 7/1992 | Japan . | |
| 0307759 | 11/1993 | Japan | 369/103 |

OTHER PUBLICATIONS

"Application of Flip-Chip Bonding Method to Optical Heads" Nagano et al; 12th meeting on Lightwave Sensing Technology, Japanese Society of Lightware Sensing Technology, Japanese Society of Applied Physics, pp. 103–109.

*Primary Examiner*—Thang V. Tran
*Attorney, Agent, or Firm*—Hayes, Soloway, Hennessey, Grossman & Hage, P.C.

[57] ABSTRACT

It is the object of the invention to provide an optical head, which can be assembled with high accuracy and operates with high stability. A laser diode is fixed on a heat sink, which is fixed on the photodiode chip. The laser diode chip emits the light in the both forward and backward directions. A mirror, which reflects the forward emitted light, are formed on a heat sink. The forward emitted light is reflected by the mirror, passes through a holographic optical element and a lens, and is focused on an optical disc (not shown). The reflected light from the optical disc proceeds along the same path in the opposite direction, is diffracted by the holographic optical element, and detected by the light detecting portions 2a to 2h on the photodiode chip. In order to control an injection current and keep the power of the emitted light constant, the backward emitted light is detected by the light detecting portion 2i on a photodiode chip 2.

4 Claims, 4 Drawing Sheets

OPTICAL HEAD WITH A HEAT SINK

FIELD OF THE INVENTION

This invention relates to an optical head applied to an optical disc recording and reading equipment.

BACKGROUND OF THE INVENTION

Considering a compact disc as an example of an optical disc, its drive is an equipment which makes a thorough examination for the presence of pits running at the speed of 1.3 m/s and having widths of 500 nm and depths of 110 nm, and its optical head has a capability of precisely irradiating a row of the pits with a light focused up to the diffraction limit.

An optical disc is portable, and has a large capacity of recording information with high density and random access property, because it is formed into a circular disc. On the other hand, its drive has disadvantages in that an information transmission rate is slow as compared with that of a hard disc drive, and a thickness is greater than that of a floppy disc drive. In order to make the thickness of the optical disc drive be as small as that of the floppy disc drive, it is indispensable to achieve greater compactness of the optical head used in the optical disk drive.

SUMMARY OF THE INVENTION

It is an object of the invention to provide an optical head, which can be fabricated with high accuracy, operates with high stability and has a small size.

According to the invention, an optical head comprises:

a laser diode chip;

a lens, which focuses a forward emitted light of the laser diode chip on an optical disc;

a diffraction element, which is positioned between the laser diode chip and the lens and diffracts a reflected light from the optical disc to provide a diffracted light;

light detecting portions which convert the diffracted lights into electrical signals;

wherein the laser diode chip is fixed to a heat sink on a photodiode chip, and the heat sink is provided with a mirror which reflects the forward emitted light of the laser diode chip.

The principle of the invention can be summarized as follows. In the optical head according to the invention, a mirror is formed on the heat sink, and the laser diode chip is fixed to the heat sink on the photodiode chip, wherein the aforementioned heat sink has the micromirror thereon, and a light emitted from the laser diode chip is reflected via a diffracting element to a focusing lens by the aid of the mirror on the heat sink. Accordingly, it becomes very easy to set the laser diode chip close to the micromirror, and so that the area irradiated with the laser diode chip becomes small, and it becomes very easy to satisfy the Marshal's criterion. Moreover, by manufacturing the photodiode chip and the heat sink with the mirror as the separated structural elements, these elements can be manufactured in ordinary processes at low prices, and the assembling with high precision becomes possible.

BRIEF DESCRIPTION OF THE DRAWINGS

The invention will be explained in more detail in conjunction with the appended drawings, wherein.

DESCRIPTION OF THE PREFERRED EMBODIMENTS

Before explaining an optical head in the preferred embodiments, the conventional optical head will be explained.

Figure 1:
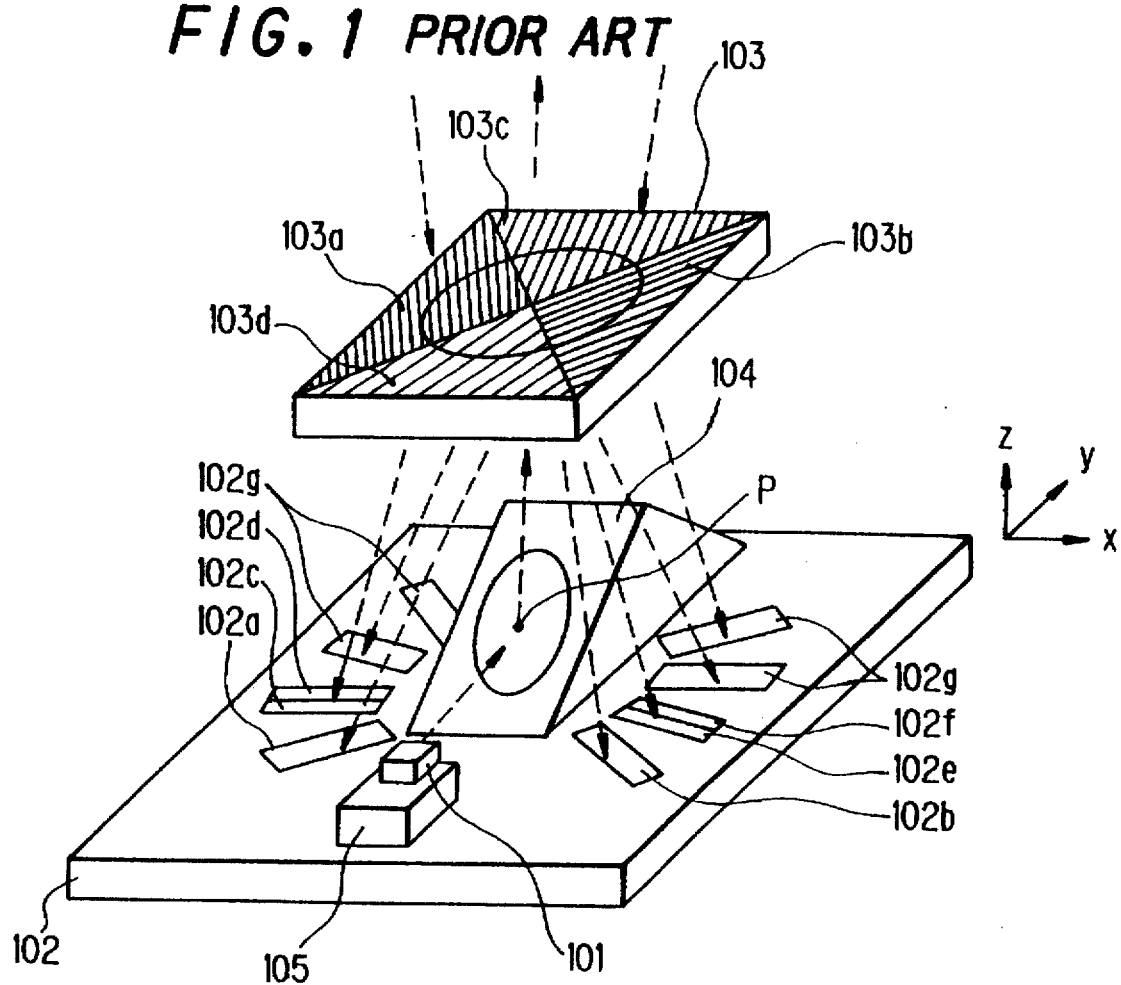
FIG. 1 is a perspective view, which shows an example of conventional optical recording and reading equipments.

As an example of conventional optical heads, the one reported in the proceeding of the 12th meeting on Lightwave Sensing Technology, Japanese Society of Lightwave Sensing Technology, Japanese Society of Applied Physics, at pages 103 to 109, will be quoted. The portion of the aforementioned optical head is shown in FIG. 1.

As shown therein, a laser diode chip 101 is fixed to a heat sink 105 on a photodiode chip 102, and a mirror 104, which reflects a laser beam, is fixed on the photodiode chip 102.

A light, which is emitted by the laser diode chip 101, is reflected by the mirror 104, passes through the holographic optical element 103, and focused on an optical disc by a lens (not shown). A light, which is reflected by the optical disc, passes through the same path in the opposite direction, is diffracted by the holographic optical element 103, and incidents on the light detecting portions 102a to 102g on the photodiode chip 102.

The holographic optical element 103 is composed of four regions 103a, 103b, 103c and 103d, and +1st-order diffracted lights of these regions are respectively detected by the light detecting portions 102a, 102b, (102c and 102d) and (102e and 102f) on the photodiode chip 102. Moreover, a −1st-order diffracted light is detected by the light detecting portion 102g.

An emitted light power of the laser diode chip 101 is varied by the ambient temperature, even when an injection current supplied to the laser diode keeps a constant value. Accordingly, in order to make the emitted light power constant, when the ambient temperature is varied, it is necessary to control the injection current by monitoring the ambient temperature. Then, the photodiode chip 102 is provided with an emitted light power monitoring portion (not shown) in the boundary surface between the photodiode chip 102 and the mirror 104. 96% of the incident light power on the mirror 104 is reflected, and remaining 4% is transmitted to the receiving region of the aforementioned monitoring portion.

If signals obtained from the light detecting portions 102a, 102b, 102c, 102d, 102e, 102f and 102g are respectively denoted by Sa, Sb, Sc, Sd, Se, Sf and Sg, a tracking error signal is obtained from (Sa−Sb), a focusing error signal is obtained by (Sc−Sd)−(Se−Sf), and a recorded signal is obtained from By integrally forming the laser diode chip 101 and the photodiode chip 102, the accuracy of relative positioning between them is improved, a fabrication can be carried out with high accuracy, the variation of their relative positions caused by the variation of ambient temperature can be reduced and stable performances can be secured.

In assembling the optical head shown in FIG. 1, the step, in which the highest accuracy is required, is fixing the mirror 104 on the photodiode 102. In other words, the position of the point P in FIG. 1, where the optical axis of a light emitted from the laser diode chip 101 intersects the surface of the micromirror 104, must be so adjusted that the point P is positioned relative to the photodiode chip 102 within the error of several μms in the y-direction. However, since the position of the point P is varied in accordance with the position where the laser diode chip 101 is fixed, the laser diode 101 is firstly fixed to the photodiode chip 102, and the mirror 104 is fixed on the photodiode chip 102 thereafter.

Figure 2:
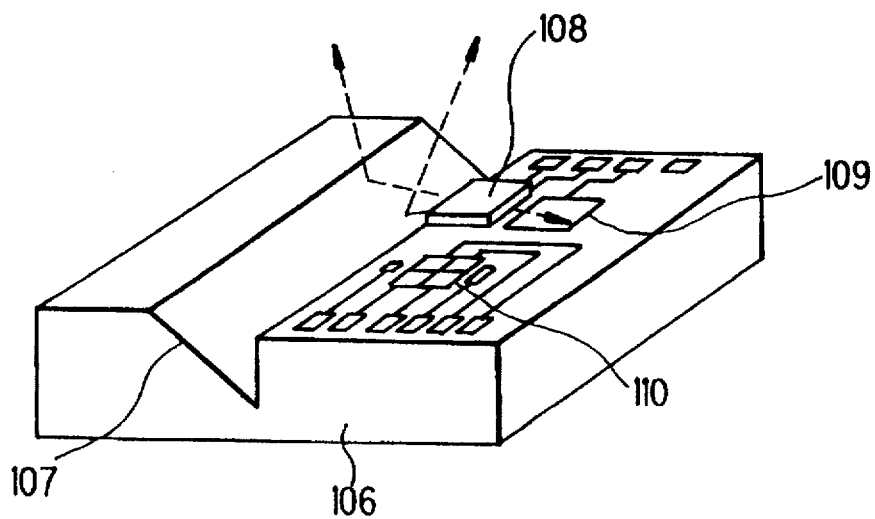
FIG. 2 is a perspective view, which shows another conventional optical recording and reading equipment.

As another example of the conventional optical head, a semiconductor laser equipment for an optical disc shown in FIG. 2, which is disclosed on Japanese Patent Kokai 4-196189, will be quoted. In the example, the monitoring light detecting portion 109 for monitoring the output power of a semiconductor laser 108 and a light detecting portions 110s for detecting signal lights are formed on a silicon substrate 106. Moreover, a V-shaped groove 107 is formed by an orientation-selective (anisotropic) etching, and the backward emitted light of a semiconductor laser 108, which is melted to the silicon substrate 106, is detected by a monitoring light detecting portion 109, and a forward emitted light power of the semiconductor laser 108 is reflected by the V-shaped groove 107 on the silicon substrate 106.

In general, an optical head is required to irradiate an optical disc with a light focused up to the diffraction limit. Denoting the lasing wavelength of a laser diode by λ, the wave front aberration of the optical head should be suppressed within λ/14, according to the Marshal's criterion.

In the former example of the conventional technologies, since errors of the arrangement of elements in assembling must be taken into consideration to some extents, and it is difficult to set the laser diode chip close to the mirror, the area of the mirror, which is irradiated with the light emitted from the laser diode chip, becomes large, and the monitoring becomes expensive in order to keep the wave front aberration within λ/14 over the whole surface of the irradiated area.

Moreover, since the mirror is fixed after the laser diode chip is fixed on the photodiode chip in the process of assembling, the sum of errors in fixing the laser diode chip and the mirror affect the difference between the path-length from the laser diode chip to the holographic optical element and that from the photodiode chip to the holographic optical element, and it arises an offset of the focus error signal.

In the latter example of the conventional technologies, since the angle of inclination of the micromirror is 45°, photodiodes must be formed on a missoriented siliconwafer, and special process of fabrication is required. Then, this device cannot be manufactured in an ordinary production line, and high cost is required.

Next, the invention will be explained referring to the appended drawings.

Figure 3:
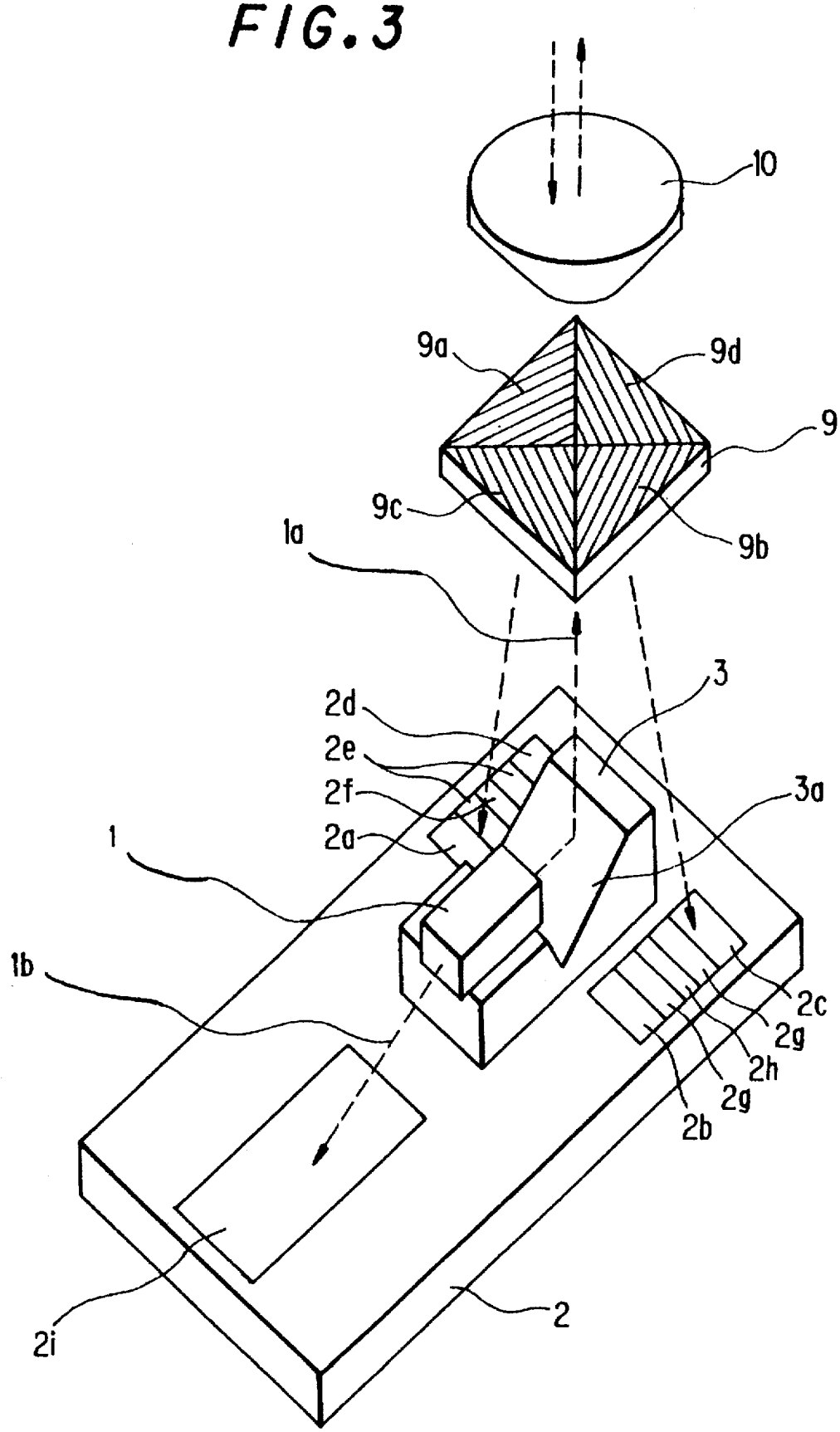
FIG. 3 is a perspective view, which shows a first preferred embodiment of the invention.

FIG. 3 shows the first preferred embodiment of the invention. In the embodiment, a laser diode chip 1 is fixed to a heat sink 3, and the heat sink 3 is fixed to a photodiode chip 2 and serves as dissipating the heat generated in the laser diode chip. Light detecting portions 2a, 2b, 2c, 2d, 2e, 2f, 2g, 2h and 2i are respectively formed on the photodiode chip 2.

The laser diode chip 1 is so fabricated that it emits lights in both forward and backward directions. Moreover, the heat sink 3 has a mirror 3a, which reflects the laser beam, and is made of a material which has a good heat conductivity and nearly the same thermal expansion coefficient as that of the laser diode. The heat sink can be made of semiconductor, such as silicon for example, obtained by an orientation-selective (anisotropic) etching, casted metal or ceramic.

A forward emitted light 1a of the laser diode chip 1 is reflected by the mirror 3a on the heat sink 3, passes through a holographic optical element 9 and a lens 10 and is focused on an optical disc (not shown). Moreover, a reflected light proceeds along the same path in the opposite direction, and is diffracted by the holographic optical element 9, and is detected by the light detecting portions 2a to 2h on photodiode chip 2. In order to avoid the situation that the emitted light power of the laser diode is varied by an ambient temperature, a backward emitted light 1b is detected by the light detecting portion 2i on the photodiode chip 2, and the injection current to the laser 1 is controlled in accordance with the output of said detecting portion.

The holographic optical element 9 comprises four regions, i.e. regions 9a, 9b, 9c, and 9d. Each diffracted light of the +1st-order of the regions 9c and 9d are respectively focused between the holographic optical element 9 and the photodiode chip 2, and detected by the light detecting portions 2e and 2f. Moreover, the diffracted lights of the −1st-order of the regions 9c and 9d are focused beyond the photodiode chip 2, and detected by the light detecting portions 2g and 2h. Furthermore, the light diffracted by the region 9a is respectively detected by the light detecting portions 2a and 2c, and the light diffracted by 9b is respectively detected by the light detecting portions 2b and 2d.

If the signals detected by the light detecting portions 2a, 2b, 2c, 2d, 2e, 2f, 2g and 2h are respectively denoted by S2a, S2b, S2c, S2d, S2e, S2f, S2g and S2h, a tracking error signal is given by (S2a−S2b)+(S2c−S2d), a focus error signal is given by (S2e−S2f)−(S2g−S2h) and a recorded signal is given by S2a+S2b+S2c+S2d+S2e+S2f+S2g+S2h.

As mentioned in the above, by forming the mirror on the heat sink and fixing the laser diode chip on the heat sink, the laser diode chip can be set close to the mirror, and therefore the wave front aberration can easily be suppressed within λ/14 over the whole irradiated area. Moreover, the laser diode chip, the photodiode chip and the heat sink can be produced by an ordinary production line at low prices. Additionally, the heat sink is fixed to the photodiode chip on the basis of an image of a portion of fixing the laser diode chip to the heat sink, the image being obtained on the mirror of the heat sink, and a deviation occurring at the fixing stage is corrected at a time when the laser diode chip is fixed to the heat sink. As a result, the assembly with high precision is realized, and an offset included in a focusing error signal is reduced.

Next, the second preferred embodiment of the invention will be explained.

Figure 4:
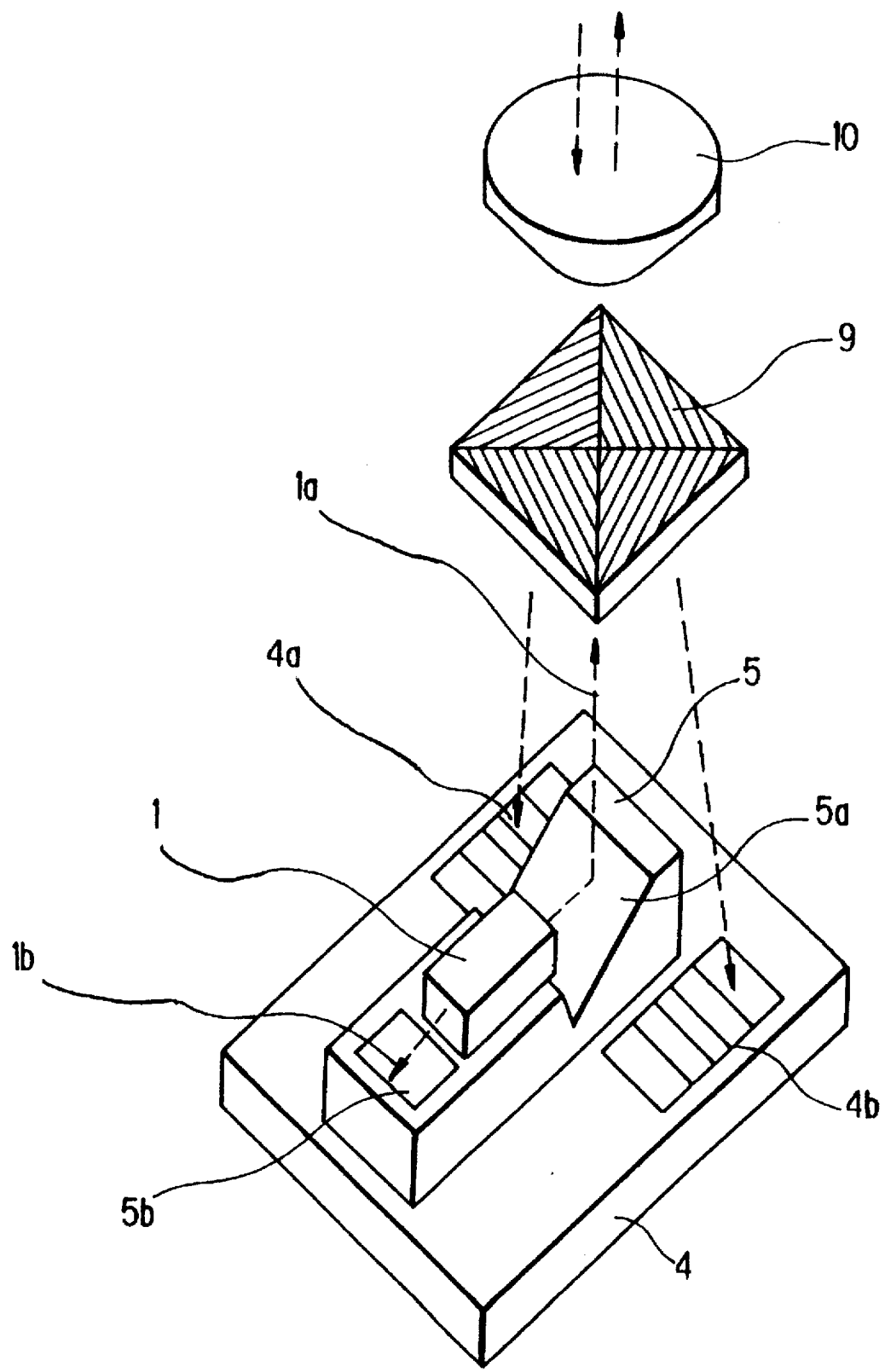
FIG. 4 is a perspective view, which shows a second preferred embodiment of the invention.

FIG. 4 is a drawing which shows the second preferred embodiment of the invention, and the same elements as those shown in FIG. 3 will be denoted by the same reference numerals.

The heat sink 5 is made of a semiconductor such as silicon, and comprises not only a mirror 5a, which reflects the laser beam, but also a light detecting portion 5b, which detects the emitted light power of the laser diode chip 1. The light detecting portion 5b is adjacent to the region where the laser diode chip 1 is fixed, and detects a backward emitted light 1b of the laser diode chip 1. A photodiode chip 4, which comprises light detecting portions 4a and 4b for detecting error signals and recorded signal similarly to the case of the first preferred invention.

Similarly to the case of the first preferred embodiment, the forward emitted laser beam 1a is reflected by the mirror 5a on the heat sink 5, and passes a holographic optical element 9 and a lens 10, and is focused on an optical disc. A reflected beam from the optical disc proceeds along the same path in the opposite direction, is diffracted by the holographic optical element 9 and detected by the light receiving portion 4a and 4b on the photodiode chip 4.

As the light detecting portions 4a and 4b, detect the error signals and recorded signals, they are required to be able to detect high frequency signals and their portions are sill isolated themselves. However, the light detecting portion 5b, which detects only the light power of the laser diode 1, is not required to be able to detect such high frequency signal, and the heat sink 5 can be manufactured in a ordinary production line at low price. Moreover, since the receiving portion 5b for measuring the light power is formed on the heat sink, the size of the optical head can be decreased as compared with that of the first preferred embodiment.

Figure 5:
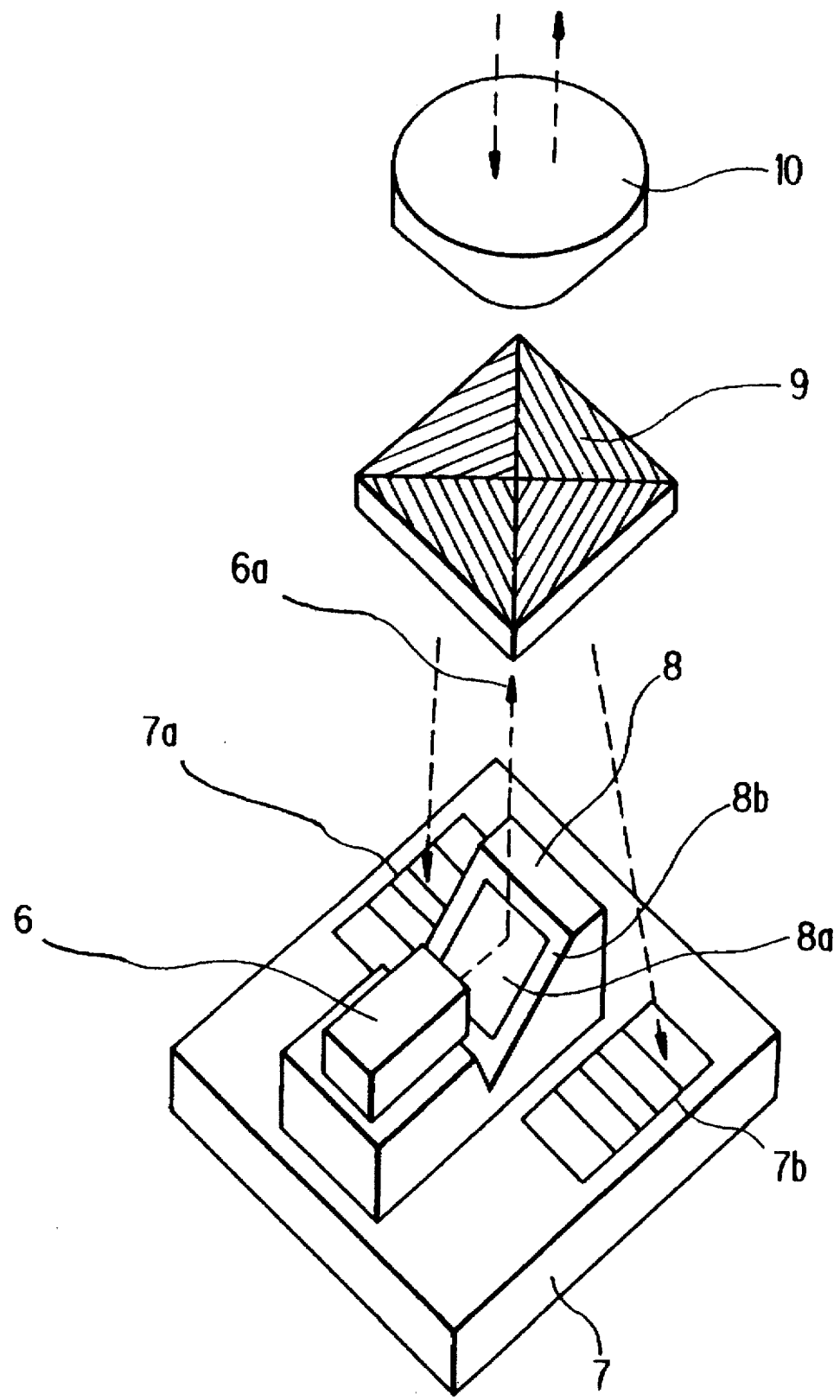
FIG. 5 is a perspective view, which shows a third preferred embodiment of the invention.

FIG. 5 shows the third preferred embodiment, and the same elements as those shown in FIG. 3 are denoted by the same reference numerals.

The difference between the embodiment shown in FIG. 5 and the second preferred embodiment shown in FIG. 4 is that a light detecting portion 8b for measuring a emitted light power of the laser diode is formed on the reflecting surface of a mirror 8a on a heat sink 8.

The emitted light 6a of the laser diode chip 6 is reflected by the mirror 8a and focused on an optical disc similarly to the case of the first preferred embodiment, but a portion of the emitted light 6a is received by the light detecting portion 8b. Moreover, the light reflected by an optical disc is diffracted by a holographic optical element 9, and detected by light detecting portions 7a and 7b on the photodiode chip.

In the first and second preferred embodiments, if an portion of the reflected light from the optical disc is again reflected by the mirror and incidents on the laser diode chip in the opposite directions, the ratio of the light powers of the forward and backward emitted lights 1a and 1b fluctuated, and thereby the power of the forward emitted light 1a, which is used for recording and reading, cannot be exactly estimated through the estimation of the power of the backward emitted light 1b. However, in the third preferred embodiment, the power of the emitted light, which is actually used for recording and reading, can be exactly estimated, the power of the emitted light can be controlled with high stability. Moreover, by forming the receiving portion 8b, which detects the power of the emitted light, on the mirror surface of the heat sink 8, the size of the photodiode chip 7 and the heat sink 8 can be decreased as compared with those in the first and second preferred embodiments.

As mentioned in the above, in the first preferred embodiment of the invention, since the mirror is formed on the heat sink, on which laser diode chip is mounted, and the emitted light from the laser diode chip is reflected towards the holographic optical element by the aforementioned mirror on the heat sink, the laser diode can be set close to the mirror, the wave front aberration over the whole surface of the irradiated area can be smaller than $\lambda/14$ and the optical head can be supplied at low prices.

In the second preferred embodiment, the mirror, which reflects the forward emitted light of the laser diode chip towards the holographic optical element, and the light detecting portion for estimating the backward emitted light from the laser diode chip are mounted on the heat sink on which the laser diode chip is fixed. Accordingly, the light detecting portion, which detects the backward emitted light of the laser diode chip can be eliminated on the photodiode chip, and therefore the size of the photodiode chip can be decreased. Moreover, since the light detecting portion for estimating th emitted light power, which is fabricated on the heat sink, is not required to have excellent characteristics, the optical head can be manufactured at low price.

In the third preferred embodiment, by fabricating the light detecting portion on the mirror surface formed on the heat sink, the power of the laser beam, which is actually used for recording and reading in the optical disc system, can be estimated with high accuracy, and the optical head with stable characteristics can be supplied at low price.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical head, comprising:
    a laser diode chip;
    a lens, which focuses a forward emitted light of said laser diode chip on an optical disc;
    a diffraction element, which is positioned between said laser diode chip and said lens and diffracts a reflected light from said optical disc to provide a diffracted light;
    light detecting portions which convert said diffracted lights into electrical signals;
    wherein said laser diode chip is fixed to a heat sink on a photodiode chip, and said heat sink is provided with a mirror which reflects said forward emitted light of said laser diode chip to the lens and wherein said light detecting portions are provided on said photodiode chip which is different from said heat sink.

2. An optical head, according to claim 1, wherein:
    said laser diode chip emits a backward emitted light, which is affected by said forward emitted light of said laser diode chip, and said photodiode chip is provided with a light detecting portion for detecting a power of said backward emitted light.

3. An optical head, according to claim 1, wherein:
    said laser diode chip emits said backward emitted light, which is affected by said forward emitted light of said laser diode chip, and said heat sink is provided with a light detecting portion for detecting a power of said backward emitted light.

4. An optical head, according to claim 1, wherein:
    a portion of said mirror on said heat sink serves as a light detecting portion for detecting a power of said forward emitted light of said laser diode chip.

* * * * *